United States Patent [19]

Muller et al.

[11] Patent Number: 4,899,438
[45] Date of Patent: Feb. 13, 1990

[54] ASSEMBLY DEVICE FOR PRESSING C-SHAPED SHEET METAL NUT ONTO A PLATE

[75] Inventors: Klaus Muller, Weil-Haltingen; Lothar Escher, Bad Bellingen; Gerhard Mack, Rheinfelden-Adelhausen; Ernst Kramer, Inzlingen, all of Fed. Rep. of Germany

[73] Assignee: A. Raymond, Lorrach, Fed. Rep. of Germany

[21] Appl. No.: 253,577

[22] Filed: Oct. 5, 1988

Related U.S. Application Data

[62] Division of Ser. No. 937,390, Dec. 3, 1986, Pat. No. 4,793,753.

[30] Foreign Application Priority Data

Dec. 4, 1985 [DE] Fed. Rep. of Germany ....... 3542841

[51] Int. Cl.[4] .............................................. B23Q 7/16
[52] U.S. Cl. ........................................ 29/813; 29/811; 221/167; 221/168; 221/312 R
[58] Field of Search ............. 29/813, 811; 221/312 R, 221/312 C, 212, 268, 167, 168, 200, 270, 272, 275, 276; 411/174, 175; 24/455

[56] References Cited

U.S. PATENT DOCUMENTS

| 3,448,236 | 6/1969 | Spisak | 221/312 R |
|---|---|---|---|
| 3,525,846 | 8/1970 | Spisak | 221/312 R |
| 3,584,761 | 6/1971 | Flanigan et al. | 221/276 |
| 3,647,129 | 3/1972 | Ehrlich | 221/268 X |
| 4,077,557 | 3/1978 | Green | 221/275 X |
| 4,365,445 | 12/1982 | Watson | 221/167 |

FOREIGN PATENT DOCUMENTS 1728372 6/1977 Fed. Rep. of Germany .
1352776 5/1974 United Kingdom .

Primary Examiner—Timothy V. Eley
Assistant Examiner—Peter D. B. Vo
Attorney, Agent, or Firm—Finnegan, Henderson, Farabow, Garrett & Dunner

[57] ABSTRACT

A clip-like, C-shaped sheet-metal nut and an assembly device therefor, the nut having a thread leg with an embossed thread portion and a clip leg having a through hole, with the forward end of the thread leg having an upwardly and forwardly inclined insertion plate. A pair of guide webs are integrally formed on the two lateral edges of the thread leg that extend upwardly at right angles to the leg with the upper edges of the webs protruding above the insertion plate and running parallel to the clip leg and with their side surfaces being in a line with the lateral edges of the clip leg to provide a substantially outer rectangular perimeter to the nut.

5 Claims, 3 Drawing Sheets

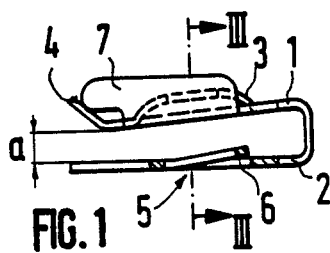
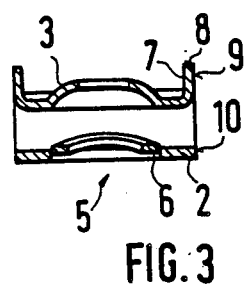
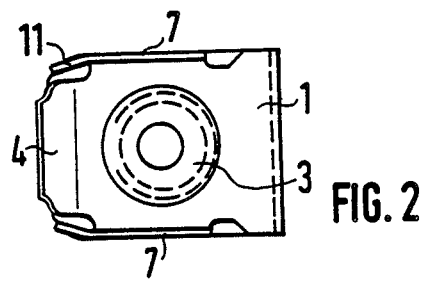
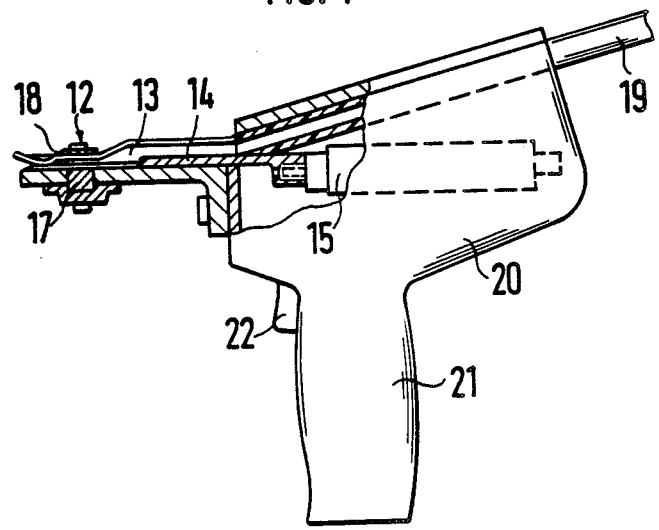

ASSEMBLY DEVICE FOR PRESSING C-SHAPED SHEET METAL NUT ONTO A PLATE

This is a division of application Ser. No. 937,390 filed Dec. 3, 1986, now U.S. Pat. No. 4,793,753.

BACKGROUND OF THE INVENTION

This invention relates to a clip-like sheet-metal nut and to an assembly device for conveying and setting the sheet-metal nut in place. These sheet-metal nuts typically have a thread leg having an embossed thread hole and a generally parallel clip leg integrally connected to the thread leg at one end with a U-shaped web to form a C-shape. They have been used for many years in the automobile industry, the domestic appliance industry and many other branches of industry to connect plate-shaped components to other components with screws. For this purpose, the clip-like nut is pushed onto the edge of a bearer plate provided with a hole until the threaded hole in the nut and the hole in the plate are aligned.

Since manually pushing on the clips or using a hammer is very laborious and also involves the risk of injury, efforts have been made for some time to create suitable assembly devices for setting the sheet-metal nuts in place. Typically, these assembly devices consist of a clip retaining head having a displacement channel for laterally feeding the sheet-metal nuts to the head, a retaining means for temporarily holding the sheet-metal nuts in position in the head and a displacement means, which can be actuated by a pressure medium, for ejecting the sheet-metal nut from the head and pressing it onto the edge of a bearer plate. In this regard, the sheet-metal nuts can be fed manually to the retaining head or by means of a magazine which contains a row of sheet-metal nuts that can be supplied automatically one after the other in orientated position to the retaining head. See for example, German Auslegeschrift No. 1,728,327 and British Patent Specification No. 1,352,776.

However, these assembly devices or guns are used in assembly lines only with reluctance, because the loading and constant changing of the magazines is a troublesome problem. Also, the sheet-metal nuts do not stack readily one above the other, because the thread leg with its embossed thread portion and its leading edge does not form a smooth plane. Moreover, the embossed thread portion of one sheet-metal nut can easily catch in the hole of the clip leg of the following sheet-metal nut and, when ejected laterally, can even interlock.

SUMMARY OF THE INVENTION

An object of the invention therefore is to provide a sheet-metal nut of the above-mentioned type that is able to be conveyed trouble-free in a specific position from a collecting container via, if possible, a flexible guide channel into the retaining head of an assembly gun. To be trouble-free, the sheet-metal nuts must not interlock with each other and they must be able to be orientated into the desired position by means of a vibration conveyor having suitable obstacles or baffles. Further, it should be possible to convey the sheet-metal nuts in the guide channel by compressed air so that the nuts can be transported quickly and reliably to an assembly gun at a remote location.

This object is achieved in accordance with the present invention by providing a clip-like sheet-metal nut comprising a thread leg having an embossed thread portion therein for receipt of a threaded member and a clip leg integrally connected to one end of the thread leg to form a C-shape and provided with a through hole in line with the thread portion. The thread leg has an insertion plate at its free end that inclines forwardly and upwardly from the leg and a pair of guide webs on its two lateral edges that extend upwardly at right angles to the leg, the upper edges of the guide webs being above the upper edge of the insertion plate and being parallel to the clip leg, with the outer side surfaces of the webs being in line with the lateral edges of the clip leg.

The invention further provides an assembly device for pressing such a sheet-metal nut having a substantially rectangular outer perimeter onto the edge of a plate comprising an assembly gun having a retaining head for holding a sheet-metal nut in position for insertion onto the plate, a displacement channel for feeding nuts to the head and displacement means for ejecting a sheet-metal nut from the head, a flexible guide channel having a rectangular inside cross-section connected at one end to the displacement channel of the gun and means connected to the other end of the guide channel for orienting the nuts into the correct position, feeding them to the guide channel and transporting them through the guide channel to the retaining head of the gun.

BRIEF DESCRIPTION OF THE DRAWINGS

The invention is described in greater detail in the preferred embodiments shown in the drawings, in which:

FIG. 1 is a side view of the conveyable sheet-metal nut of this invention;

FIG. 2 is a plan view of the sheet-metal nut of FIG. 1;

FIG. 3 is a sectional view of the sheet-metal nut taken along the line III—III in FIG. 1;

FIG. 4 is a side view of an assembly gun for setting the sheet-metal nut in place, with the retaining head of the gun in section;

DETAILED DESCRIPTION OF THE INVENTION

Figure 5:
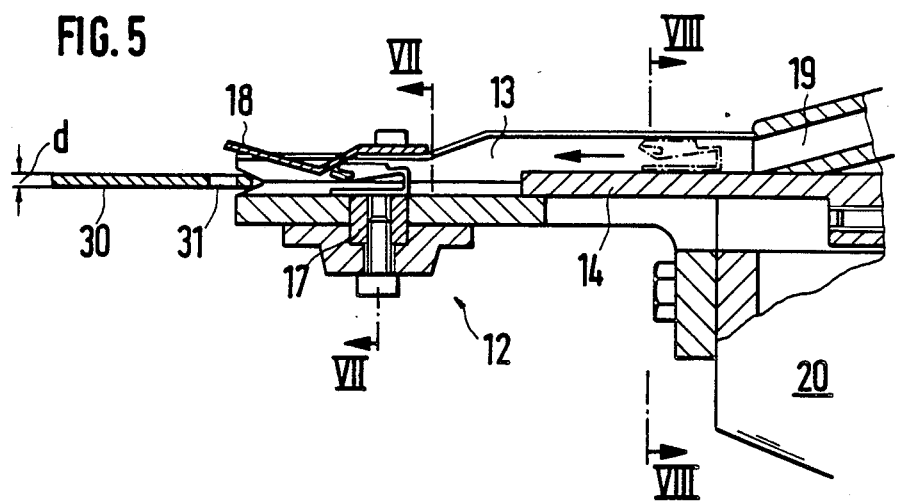
FIG. 5 is an enlarged partial view of the retaining head of the gun having a sheet-metal nut ready for pressing onto the edge of a bearer plate.

The sheet-metal nut shown in FIGS. 1–3 consists essentially of a thread leg 1 and a clip leg 2 which legs are connected together at one end to form a C-shape. In the center of the thread leg is an embossed thread portion 3 having a screw receiving hole and on its leading or free end is an insertion plate 4 that protrudes upwardly at an inclined angle. Thread leg 1 preferably inclines downwardly toward clip leg 2 and the distance "a" between its free end and the clip leg is less than the thickness "d" of a bearer plate 30 to which the nut is to be affixed (See FIG. 5), so that the sheet-metal nut, when pressed onto the bearer plate, opens out in a resilient manner and is firmly clamped on the plate by the two legs 1 and 2.

Figure 6:
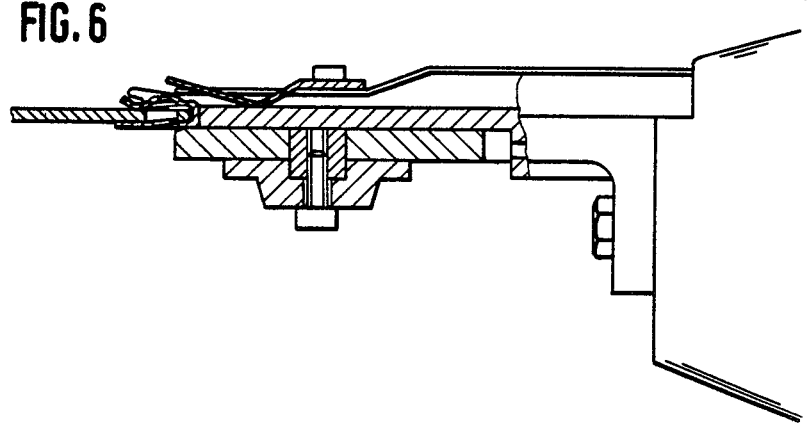
FIG. 6 is a view similar to FIG. 5 with the sheet-metal nut pressed onto the bearer plate.

Clip leg 2 has a through hole 5 in line with thread portion 3 that is surrounded by a centering ring 6 which is bent up toward the rear or away from the free end at an inclined angle in the push-on direction of the nut. The outside diameter of centering ring 6 corresponds to the diameter of the hole 31 in the edge of bearer plate 30 (See FIG. 5), so that, when the sheet-metal nut is pressed onto the bearer plate, the centering ring will engage in the hole 31 and hold the sheet-metal nut in position relative to the hole (See FIG. 6).

In accordance with the invention, guide webs 7 are integrally formed on the two lateral edges of thread leg 1 that extend upwardly at right angles to the leg, with the upper edges 8 of the guide webs being substantially parallel to clip leg 2 and protruding just above the upper edge of insertion plate 4 and, in the embodiment shown, also above embossed thread portion 3. As shown in FIG. 3, the outer side surfaces 9 of guide webs 7 are at the same distance from one another as the lateral edges 10 of clip leg 2 to provide a generally rectangular perimeter to the nut so that it can be conveyed through a guide channel having a rectangular cross-section.

Figure 9:
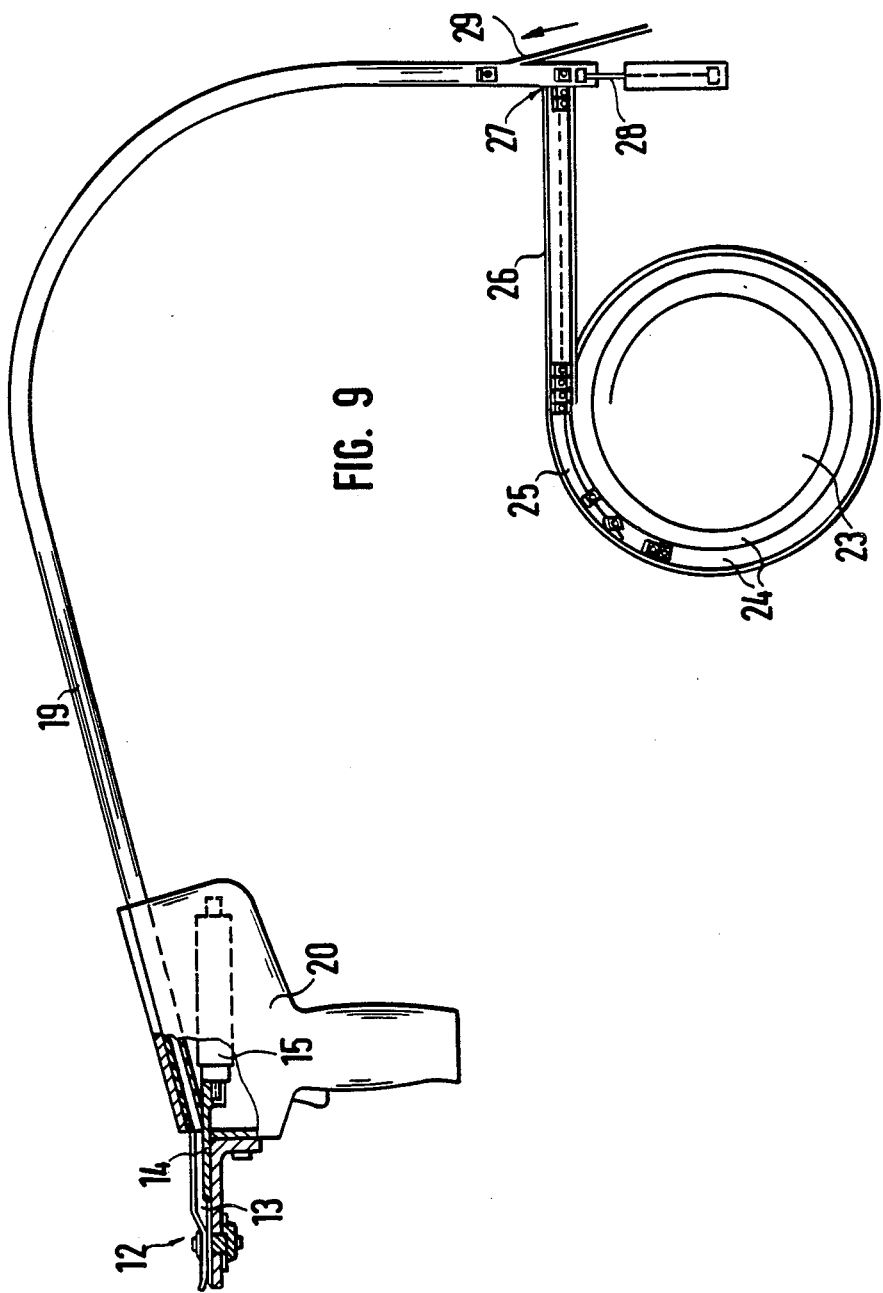
FIG. 9 shows a complete assembly device for separating, orientating, conveying and setting a sheet-metal nut.

So that the sheet-metal nuts can be guided without difficulty and with as little friction as possible through such a channel such as a flexible guide channel 19 and into an assembly gun as shown in FIG. 9, the forward edges of guide webs 7 are pressed slightly toward each other near insertion plate 4 and the front corners of the webs as well as those of clip leg 2 are rounded off. (See FIGS. 1 and 2).

In the present embodiment, embossed thread portion 3 is designed to receive a self-tapping sheet-metal screw. Sheet-metal nuts having other common thread configurations up to the threaded bush for metric threads can also be used, it being possible in the latter case for the threaded bush to protrude slightly above the upper edges 8 of guide webs 7. In this case, a suitable guide groove adapted to the bush contour must then be formed in the upper transverse wall of guide channel 19 as well as in the displacement channel 13 of the assembly gun described below.

Figure 7:
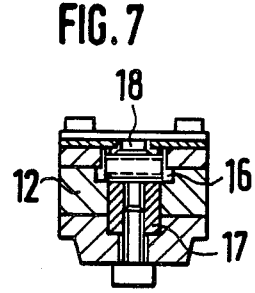
FIG. 7 is a sectional view of the retaining head taken along the line VII—VII in FIG. 5.
Figure 8:
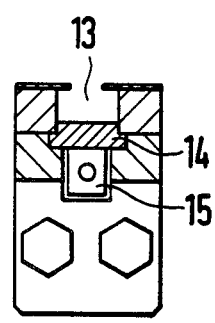
FIG. 8 is a sectional view of the displacement means of the gun taken along the line VIII—VIII in FIG. 5.

An assembly gun especially suitable for setting these sheet-metal nuts in position is shown in FIGS. 4 to 8. This assembly gun consists essentially of a retaining head 12 for temporarily holding a sheet-metal nut in position for insertion onto a bearer plate, a displacement channel 13 for feeding the nuts to the head and slidable displacement means for ejecting the nuts from the head of the gun and onto a bearer plate. As embodied, this displacement means comprises a ram 14 slidably mounted in displacement channel 13 and displacable by a pneumatic cylinder unit 15. Displacement channel 13 as shown in FIGS. 7 and 8 has an essentially rectangular cross-section with two lateral grooves 16 in its base for guiding ram 14.

At the front end of channel 13 and in the retaining head 12 of the gun is a permanent magnet 17 for holding the nut in position as well as a spring clip 18 that extends down into displacement channel 13 above magnet 17. Spring clip 18 arrests forward movement of the sheet-metal nuts as they are supplied to the channel and it together with magnet 17 holds it in place, but when the sheet-metal nut is pushed forward by ram 14, clip 18 springs upwardly to permit the nut to pass. (See FIG. 6).

A flexible guide channel 19 having a rectangular inside cross-section opens out above ram 14 and forms an extension of displacement channel 13, the sheet-metal nuts being displaceable in the longitudinal direction in the channel. Displacement means 14 and 15 at the forward end of guide channel 19 are located in gun housing 20 and retaining head 12 is mounted at the front of the housing. In the lower part of housing 20 is a handle 21 having a trigger 22 for actuating ram 14 when a sheet-metal nut is to be pressed onto the edge of a bearer plate 30.

Means connected to the opposite end of channel 19 are further provided for orienting the nuts into the desired position, feeding them to the channel and transporting them through the channel to the displacement channel and into the head. As embodied and as shown in FIG. 9, this means comprises vibration pot 23, where the sheet-metal nuts are separated on a spiral track 24, the nuts passing through the spiral shape and being conveyed upwardly to the upper regions of pot 23 by the vibrations where they are then orientated by various obstacles and a guide edge 25 into a specific position. From guide edge 25, the sheet-metal nuts shift sideways next to one another along channel 26 by means of the same vibration and into an opening 27 in guide channel 19. There they are first pushed forward by a pneumatically actuable ram 28 and then, with the insertion plate of the clips leading, they are blown by laterally supplied compressed air 29 through channel 19 and into displacement channel 13 and eventually into the retaining head 12 of the assembly gun.

The assembly device described is not only suitable for conveying and setting sheet-metal nuts according to the invention, but is generally suitable for all C-shaped sheet-metal clips of similar configuration provided they are equipped, like the present sheet-metal nut, with appropriately integrally formed guide webs and have an outer contour compatible with the cross-section of the guide channel and the displacement channel of the gun.

Owing to the guide webs 7, the nut, with the insertion plate in the front, can easily be conveyed pneumatically over relatively great distances through a flexible guide channel having a rectangular cross-section and can be reliably guided into the retaining head of the assembly gun, with the transverse U-shaped web between the two legs providing the requisite working surface for the air. Moreover, the sheet-metal nut can also be transported in the transverse direction, with the guide webs pressing flat against one another. This offers the additional advantage illustrated in FIG. 9 where the sheet-metal nuts are first conveyed in side-by-side relationship from a vibration pot into a vibration channel and then into the flexible guide channel where they can be blown in a longitudinal direction to the assembly gun. With this special design of the sheet-metal nut and an assembly gun having a long guide channel and a supply device for separating and orientating the sheet-metal nuts into a specific position and feeding them one by one into the path of the guide channel, it is possible to continuously send orientated sheet-metal nuts into the assembly gun of the assembler from an unarranged pile of sheet-metal nuts at a remote location, so that the gun is always ready for use at any time.

What we claim is:

1. An assembly device for pressing C-shaped sheet-metal nuts onto the edge of a plate comprising, in combination, a plurality of sheet metal nuts of substantially rectangular cross-section and having first and second legs integrally connected at one end by a transverse web to form a C-shaped nut open at the end opposite the web for insertion of the nut onto the edge of a plate, the legs each having two lateral side edges and a pair of guide webs extending upwardly from the two lateral side edges of one of the legs at right angles to said one leg and away from the other of said legs, said guide webs having upper edges parallel with and outer side surfaces in line with the lateral side edges of said other leg and an assembly gun having a retaining head for holding a sheet-metal nut with its open end facing forwardly for insertion onto a plate, a displacement channel for feeding the nuts to the head with their open end facing forwardly and displacement means acting on the transverse web of the nuts for ejecting the sheet-metal nuts from the head, a flexible guide channel of rectangular inside cross-section compatible with the rectangular contour of the nuts connected at one end to the displacement channel of the gun and means connected to the other end of the guide channel for orienting the nuts into side-by-side relation with the outer side surfaces of the guide webs adjacent one another from a supply of nuts, feeding them to the guide channel and transporting them through the guide channel with their open ends facing forward to the displacement channel of the gun.

2. The assembly device of claim 1, wherein the orienting, feeding and transporting means comprises a vibration pot in which the sheet-metal nuts are separated and orientated into side-by-side relation and conveyed one at a time to the guide channel and means for supplying compressed air to the guide channel to transport the nuts to the retaining head.

3. The assembly device of claim 1, wherein the displacement means comprises a ram slidably mounted in the displacement channel and a pneumatic cylinder for actuating the ram.

4. The assembly device of claim 1, including a magnet located in the retaining head for releasably holding the nut in position for ejection by the displacement means.

5. The assembly device of claim 4, including a resilient spring clip that extends down into the path of the nut in the displacement channel opposite the magnet to arrest forward movement of the nut adjacent the magnet as it is fed to the retaining head, but that yields to permit the nut to pass upon actuation of the displacement means.

* * * * *